Dec. 21, 1948.    L. D. SMILEY ET AL    2,456,897
ELECTROLYTIC CLARIFICATION APPARATUS
Filed May 19, 1942    3 Sheets-Sheet 1

INVENTORS
Lloyd Dunn Smiley
BY Edward S. Lansing
John C. Kerr
ATTORNEY

Dec. 21, 1948.   L. D. SMILEY ET AL   2,456,897
ELECTROLYTIC CLARIFICATION APPARATUS
Filed May 19, 1942   3 Sheets-Sheet 2
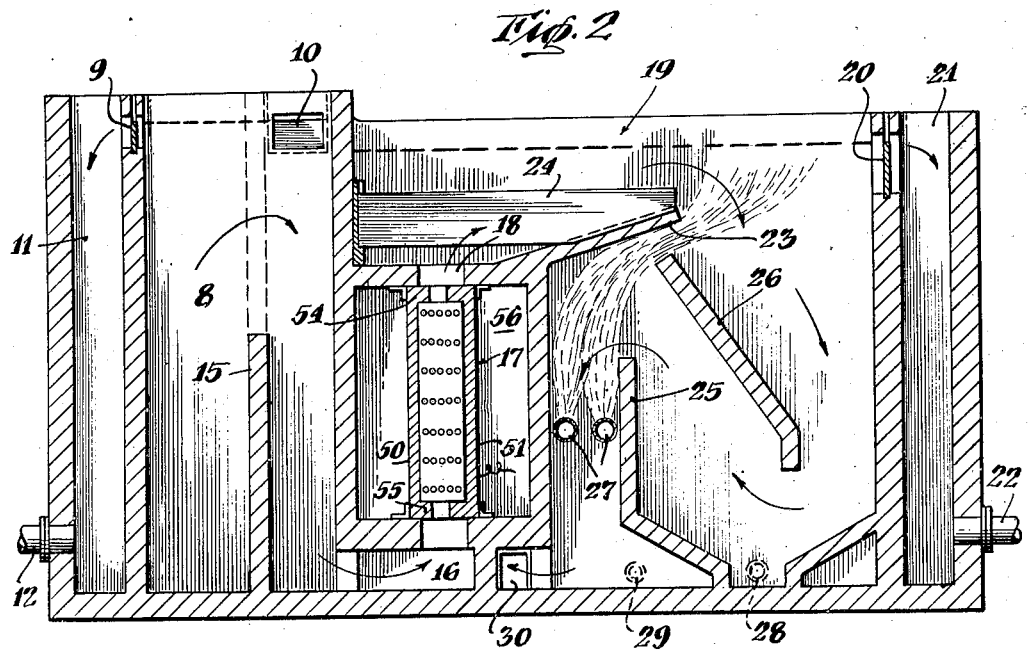
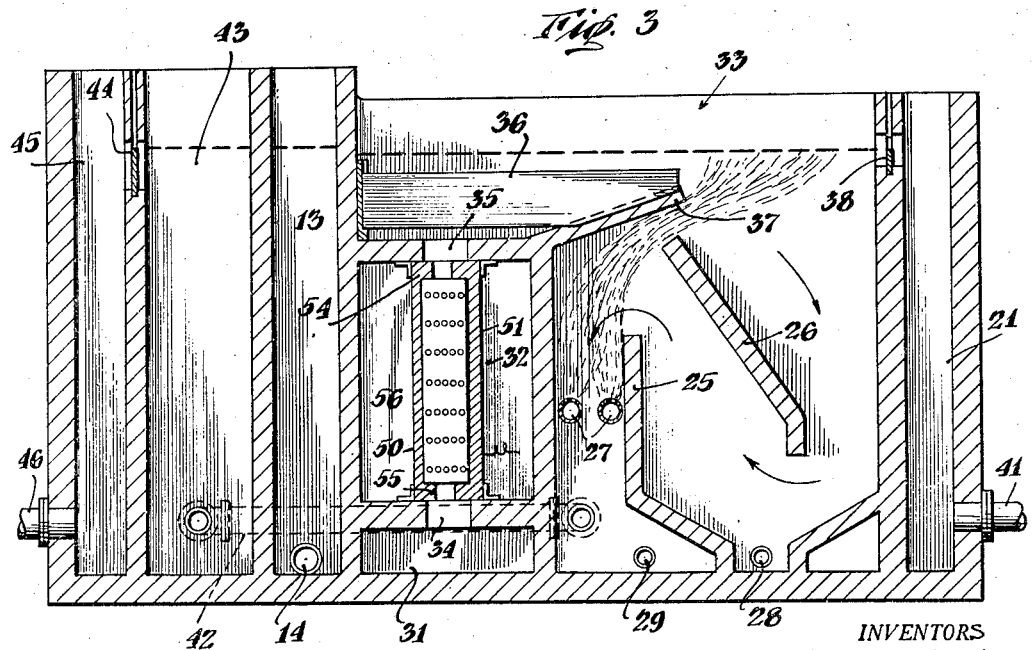
INVENTORS
Lloyd Dunn Smiley
BY Edward S. Lansing
John C. Kerr
ATTORNEY Dec. 21, 1948.    L. D. SMILEY ET AL    2,456,897
ELECTROLYTIC CLARIFICATION APPARATUS
Filed May 19, 1942    3 Sheets-Sheet 3
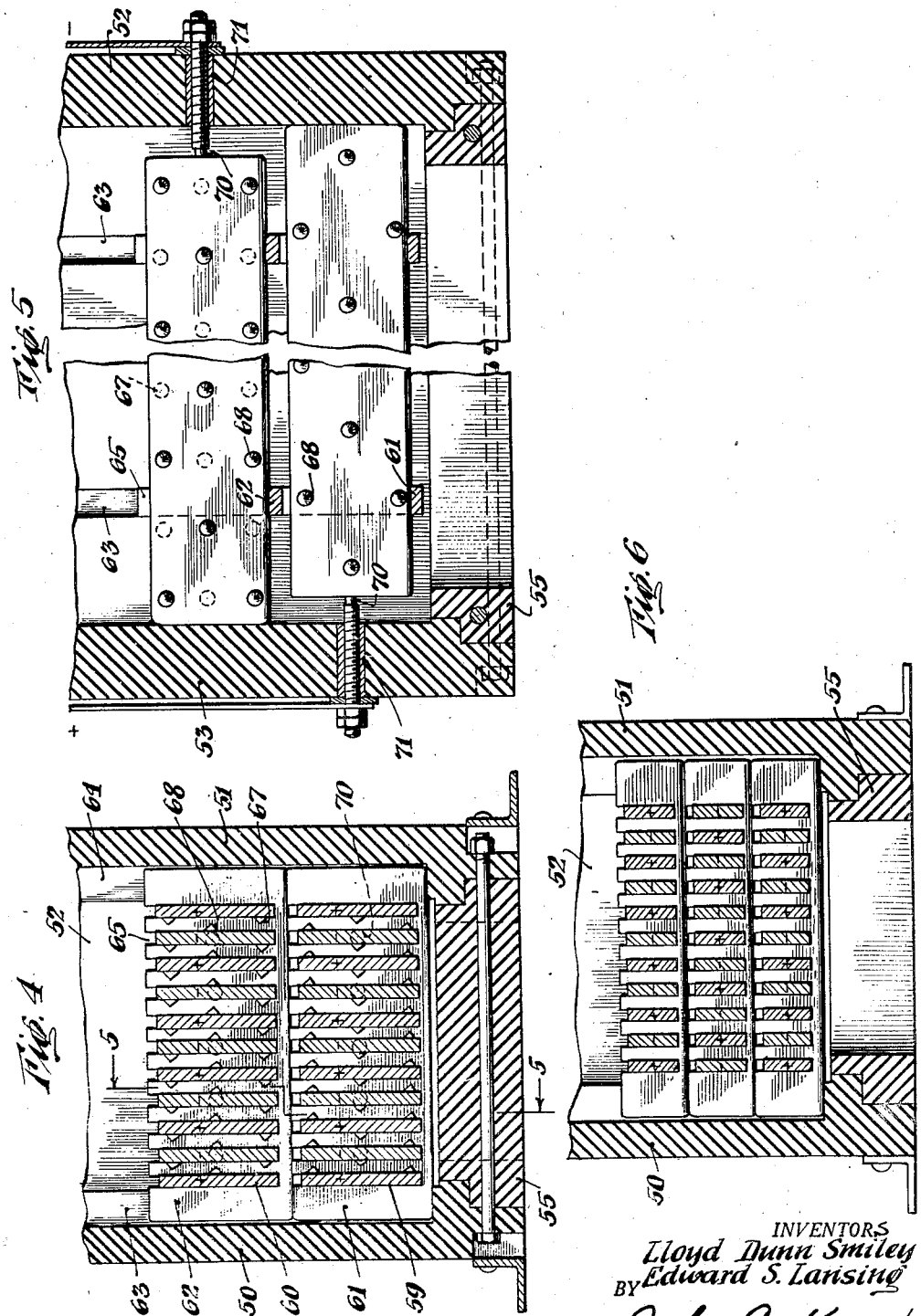
INVENTORS
Lloyd Dunn Smiley
Edward S. Lansing
BY
John C. Kerr
ATTORNEY Patented Dec. 21, 1948

2,456,897

UNITED STATES PATENT OFFICE 2,456,897

ELECTROLYTIC CLARIFICATION APPARATUS

Lloyd Dunn Smiley, Jackson Heights, and Edward S. Lansing, New York, N. Y., assignors, by direct and mesne assignments, of one-half to said Lansing and one-half to Howard B. Bishop, Summit, N. J.

Application May 19, 1942, Serial No. 443,596

2 Claims. (Cl. 204—232)

1

This invention relates to the treatment of waste effluent from industrial sources and sewage. A constantly growing problem is the need for efficient and economical systems for treating sewage and other waste effluent to meet standards designed for preventing the pollution of natural streams. Many millions of gallons of industrial waste effluent and sewage are daily flowed into rivers, with the result that the rivers are contaminated with finely divided solids and bacteria. State and municipal regulations vary as to the amount of oxygen demand which an effluent might have for permitting its disposal into a local stream, and these regulations are being continually changed so as to lower the permissible oxygen demand of the effluent. It therefore is becoming increasingly important to provide a treating system having a sequence of operations which afford an economical and expeditious manner of converting water containing solids and impurities in various forms into a clarified and substantially bacteria-free liquid which is well within the limits provided by public health regulations pertaining to pollution.

Treatment of sewage for reduction of pollution must attain reduction of bacteria-content, reduction of bio-chemical oxygen demand and reduction of solids contained, and must effect a suitable clarification of the effluent prior to final disposal. The object of the present invention is to accomplish all of these aims and to provide apparatus and a process capable of operation at a relatively low power consumption and with low operating cost. The process carried on by apparatus of the present invention treats a flow of effluent to effect an electro-chemical floc and produce a substantial reduction of bacteria concomitantly and without interruption of the floccing and treating process and without disturbing the floc by destroying its buoyancy before separation of the solids from the clarified water is accomplished. The treating progresses as the effluent advances, and the reducing action is attained by the arrangement and construction of electrolytic cells and by their relationship to other portions of the apparatus and to each other.

There may be several units each containing an electrolytic cell arranged in series with the effluent of one unit passing to the next unit in order, but for some effluents a single electrolytic cell will suffice. The number of units which are employed is dependent upon many variable factors, including the kind and condition of the effluent, the rate of movement of the effluent through a single unit, the degree of clarification desired, the re-

2 duction of bacteria content desired, and the reduction of the oxygen demand desired. When several electrolytic cells are used they have similar and comparable operating characteristics of flow velocity, time element of treatment and proportionate share of the total power cost in watts per gallon of effluent treated.

Each cell comprises a multiplicity of pairs of electrodes providing for the flow of effluent between pairs of electrodes of opposite polarity so that the effluent will flow upwardly and directly towards a level of flotation whereby the treating and flotation actions of the gases generated are fully realized. By providing a level of flotation immediately above the electrolytic cell the contents of the cell are directly and quickly brought to the flotation level. The electrodes are preferably arranged in banks with oppositely-charged electrodes constituting the walls of vertical channels of flow so that all of the solid particles have ample opportunity to be charged with positive or negative electricity and the bacteria content of the cell is uniformly treated to electric shock.

The electrolytic action augments any chemical bonding or floccing action of the electrolyte by causing collection of positively and negatively charged particles with flocculent masses. This electrical floccing or bonding action and the shocking action occurs coincidentally with the generation of gases by which all elements are more or less turbulently disturbed and the buoyancy of the flocculated particles is increased. We have discovered that the electrostatic bonding action of positively and negatively charged particles may be enhanced by an electrode arrangement which causes the solid particles to travel from one and another electrode into contact with particles oppositely charged, and that by assuring this action throughout the full length of travel of the effluent within the cell, low voltage and low current may be used to floc the particles. Another manner of augmenting agitation to attain this end is to utilize devices which provide stationary mechanical means whereby the solid particles in the flowing stream are caused to travel towards one or the other of the electrodes due to flow velocity and are thus positively directed towards oppositely charged particles without employment of moving parts.

By utilizing a mechanical arrangement of the electrodes or of devices associated therewith, the passage of current between the electrodes is not wholly depended upon to cause movement of the positively charged particles from the anode towards the cathode and into contact with negatively charged particles. The mechanical agitation permits of a wider spacing between electrodes than would be possible with a given low voltage current when the current is solely depended upon to produce the intermingling of positively and negatively charged particles. The number of watts per gallon of liquid treated is accordingly very much lowered for the same power input. The rate of flow of liquid past the electrodes may be very much increased while at the same time the electrostatic bonding effect of the suspended particles is completed during the passage of the liquid through the cell.

In practice it is necessary to have the lineal electrode area of an essentially continuous length to provide the required time for the electrochemical phenomena to take place and this length is dependent upon the amount of agitation and the rate of flow for a given voltage. Agitation is produced in proportion to the rate of flow or velocity of the liquid passing vertically through the cell and there is a definite relation between rate of flow, length of electrode, amount of agitation and voltage used. A flow velocity within a range of 0.5 to 1.0 foot per second for a period of current application of 12 to 6 seconds has given satisfactory separation for sewage and industrial waste effluent. For this operation the power consumed varied approximately from 0.75 to 2.00 watts per gallon.

It is a primary and essential part of the process that the introduced liquid have a pH value other than neutral, and this may be accomplished by the introduction of a suitable reagent, such as alum, ferric chloride, sodium aluminate or other acids or alkalies. In addition to the introduction of a suitable electrolyte for pH control, sodium chloride may be introduced. By electrolysis the sodium chloride forms sodium hypochlorite which operates in the elimination of bacteria and also produces a bleaching effect on suspended or dissolved substances in the water.

Liberation of oxygen at the anode also purifies the liquid as it reduces the bio-chemical oxygen demand of the solids contained in the effluent. When salt has been introduced into the water or the water is naturally brackish, chlorination results from the generation of sodium hypochlorite by electrolysis. The passage of electrical current also contributes to the elimination of bacteria by electrical shock.

The positive electrodes or anodes should be substantially insoluble from the action of chemicals and from the action of the current. Current has the tendency to throw off particles from the positive electrodes into solution. Metals which give off objectionable color to the treated liquid are to be avoided, as well as other metals which tend to disintegrate. An iron alloy containing approximately 14.5% of silicon is suitable and one such alloy is obtainable on the market under the trade name "Duriron." This high silicon alloy is substantially unaffected by the chemicals present in the usual forms of liquids treated, and it is likewise extremely resistant to electrolytic decomposition.

Among the industrial uses to which water-treating apparatus has application is the clarification of effluent from paper-making apparatus. It has been found that the treatment of such effluent effectively removes impurities such as fiber, rosin, clays and size. These solids are caused to flocculate when their containing liquid is passed through the electrolytic cell and while this is taking place color is removed by the bleaching action of chlorine and oxygen. In addition, the bacteria content in the treated liquid is neutralized so that the final clarified liquid can be re-used in the paper-making apparatus when desired. This is also true of the cellulose fibers which are recoverable by flotation. When the effluent of paper-making apparatus is treated other than for reducing its pollution characteristics, it is desirable to pass the liquid effluent through more than one stage of electrolytic treatment. In order to accomplish this the discharge of clear liquid from the first passing is conducted to a second electrolytic cell where any remaining solids formed of finely divided particles in suspension are flocculated and removed by flotation. The clarified water is then conducted back to the paper-making apparatus for re-use.

While our process is capable of being carried out with different forms of apparatus, we have devised an apparatus which embodies a series of chambers by which the different stages of operation are efficiently carried out.

Having reference to the drawings,

Fig. 2 is a sectional elevation on line 2—2 of Fig. 1;

Fig. 3 is a sectional elevation on line 3—3 of Fig. 1;

Fig. 4 is an enlarged sectional elevation of the lower end of the electrolytic cell illustrated in Fig. 2;

Fig. 5 is a section on line 5—5 of Fig. 4; and

Fig. 6 shows a modified arrangement for the electrodes.

Figure 1:
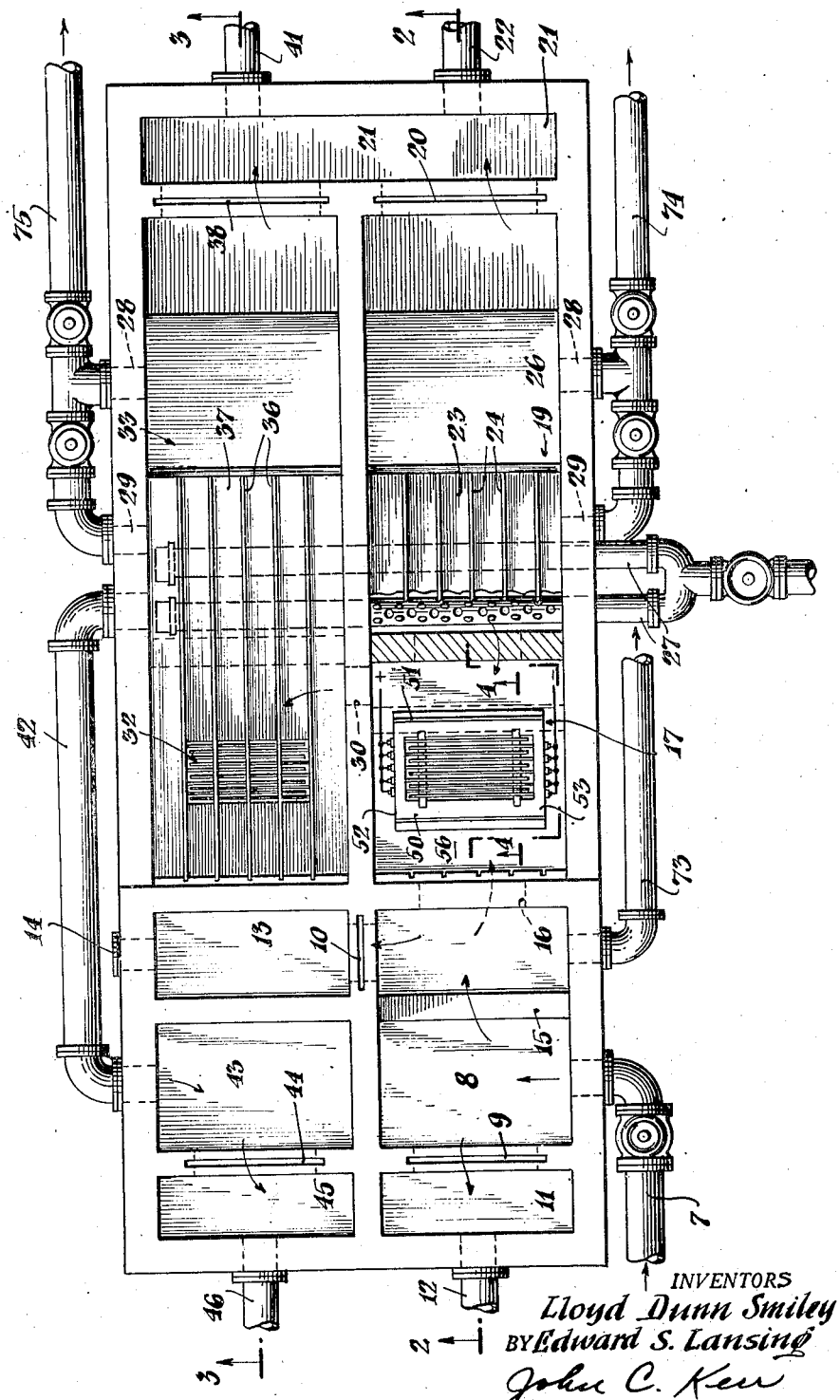
Fig. 1 illustrates a plan of the apparatus showing a portion thereof broken away.

The effluent enters the apparatus through a conduit 7, Fig. 1, and completely fills chamber 8 to a height determined by weirs 9 and 10. The positions of these weirs are adjustable to conform with the quantity and kind of effluent being treated. The overflow of weir 9 is received in chamber 11 and leaves through conduit 12. It may be eventually returned to the apparatus through conduit 7. The position of weir 10 is adjusted to cause the overflow of scum and foam into foam compartment 13 which is drained through pipe 14. Partition 15 in chamber 8 has an upper edge considerably above the bottom of the chamber and over which the effluent freely moves. This effluent passes from chamber 8 through a conducting passageway or conduit 16 whose outlet opens immediately below an electrolytic cell 17. Partition 15 prevents heavy particles, such as metals, grit and pebbles, from entering conduit 16.

The electrolytic cell consists of four vertical walls closely surrounding the electrodes. The cell constitutes a passageway within which the effluent rises vertically and from which it is discharged through a connecting means or conduit 18 to a large chamber 19. The chamber 19 provides a quiet pond having a horizontal area greatly exceeding the horizontal cross-sectional area of the electrolytic cell. With respect to the surface area of the pond the area of the cell and of its discharge opening is greatly restricted. The level of this pond is determined by a weir 20 over which the flocculated particles may be drawn off. These particles are floated over the weir and into a chamber 21 from whence they are removed through a conduit 22.

An achievement of the apparatus of the present invention is the clearing away of rising flocculated particles immediately above the cell by assuring their continued travel upwardly. To this end the flotation level above the cell outlet opening 18 is maintained low enough to float the flocculated particles before they have lost their buoyancy and upward momentum.

Ordinarily, the sudden opening of a restricted outlet into a larger area causes rapid diminution of flow velocity of liquid, but diminution of flow velocity is somewhat controlled by the progressively increasing area of the ascending horizontal sections provided by the inclined ledge 23 and the relatively low head of water above the exit opening 18 as compared with prior efforts. These factors also serve to maintain the upward flow of particles in and with respect to the movement of the containing water.

Within the chamber 19 and spaced from and just above the outlet of the electrolytic cell are a number of baffles 24 which are arranged parallel to each other and provide aisles therebetween extending lengthwise of the apparatus in the direction of flow of the liquid pasisng beyond the rim of the ledge 23. These baffles assist in quiescing the liquid and in eliminating time-consuming cross flow of floating solids leaving the electrolytic cell.

The interior of chamber 19 is preferably provided with a partition 25 and a baffle 26. These have the effect of extending the length of the path of flow of the treated liquid within chamber 19. These increase the period of time during which the treated liquid remains in the chamber and thereby provides additional opportunity for the particles not already floated to rise to the surface of the pond.

One or more perforated pipes 27 from which air is released may be advantageously used for aerifying the liquid before it leaves chamber 19. By positioning these pipes under ledge 23 and below the top edge of partition 25, the air released thereby will sweep through all of the liquid before it reaches outlet 30. The rising air will tend to carry upwardly the current of liquid leaving the lip of ledge 23 and thus further assist the flotation and clarification process. Waste outlets 28 and 29 are provided at the bottom of chamber 19 for draining and cleaning purposes.

The treated and clarified liquid is removed from chamber 19 through a conduit 30. For many uses the treatment afforded the liquid is sufficiently complete when it reaches conduit 30 as, for example, when the liquid is sewage being treated for the purpose of reducing its pollution capabilities.

For industrial uses, such as for recovering fiber and for rendering the liquid suitable for re-use, it is sometimes desirable that the liquid receive further treatment and in such case it is conveyed through a second stage of treatment. As shown in Figs. 1 and 3, conduit 30 discharges into a chamber 31 from whence it is conducted through a second electrolytic cell 32. This electrolytic cell discharges into a chamber 33 which provides a second quiet pond.

Electrolytic cell 32, chamber 33, associated communicating means 34, 35, baffles 36 and ledge 37 are substantially the same as the corresponding elements contained in the first stage of the passage and function similarly. However, the level of the liquid contained in chamber 33 is maintained lower than the level of the liquid contained in chamber 19 by weirs 38 and 44 so that the head of liquid within the apparatus will have a descending gradient.

As in the case of the first stage, the solid particles floated upon the surface of the liquid contained in chamber 33 are drawn off into chamber 21 from which they may be withdrawn through conduits 22 and 41. Clarified liquid is withdrawn from chamber 33 through conduit 42 from whence it is discharged into a chamber 43, Fig. 1. Weir 44 determines the level of the liquid in chamber 43 and the clarified water is received over this weir into chamber 45 from which it is withdrawn through a conduit 46.

The electrolytic cells are similarly constructed and a description of one will suffice for explaining their construction. Referring to Figs. 1 and 2, the electrolytic cell is in the form of a vertically-extending conduit having a rectangular cross-section. The four walls 50, 51, 52 and 53 of the conduit are bolted together and to upper and lower frame members 54 and 55, as shown in Figs. 4 and 5. Each frame member has an opening in communication with the respective upper and lower connecting means, Fig. 2. Space 56 outside of the walls is a void.

The electrodes contained in the cell are so arranged as to permit the upward passage or flow of liquid and their number is such as to provide sufficient area to cause complete electrolyzing of liquid passing through the cell. As illustrated in Figs. 4 and 5, the electrodes are arranged in groups spaced from each other with each group having a plurality of anodes and cathodes. The total area of electrode surface may be varied by varying the number of groups.

The anodes and cathodes in each group are alternately placed and the electrodes in the different groups are arranged in substantially vertical alignment so as to provide substantially clear upwardly extending paths of flow for the liquid passing through the cell. As illustrated in Fig. 4, it will be seen that the first anode 59 in the lower group of electrodes is exactly below the first anode 60 in the next upper group of electrodes, but they may be offset slightly if desired. The same arrangement exists with the second, third, fourth and fifth electrode in each group with the positive electrodes in one ascending series and the negative electrodes in another ascending series. The electrodes are supported by brackets 61, 62 of insulating material which are engaged in slots 63, 64 in the side walls 50, 51 of the electrolytic cell. The electrodes are individually supported in slots 65 contained in the brackets. The electrodes may be removed by removing either side wall 52 or 53.

By mounting the electrodes in groups one above the other, space is provided all about each individual electrode. This arrangement causes a certain amount of turbulence in the flowing liquid. This turbulence creates desirable agitation for assisting the electrolyzing of the solid particles throughout the flowing liquid. It is important that the agitation be sufficient to assure electrostatic coagulation of the suspended particles and distribution of the gases formed to all of the suspended solids. We have discovered that in order to assure that each of the suspended particles will be properly affected by electrolytic action, it is advantageous to provide small projections on each of the electrodes which will have the effect of diverting the flowing liquid and contained particles towards electrodes of opposite polarity as the liquid flows between the electrodes. This has been accomplished by attaching projections 67, 68 to the respective electrodes. The arrangement of the projections shown in the drawings is by way of illustration only, but is an arrangement which has been found to give satisfactory results. These projections may be made of suitable insulating material, and we have successfully used rubber by vulcanizing the same upon the electrodes.

The electrodes are electrically connected to bus bars through contacts 70 which are individually forced into tight engagement with each electrode. These contacts are mounted at the ends of screw elements 71 which are so adjusted as to form a good contact between the contacts and the electrodes. Bus bars are connected to the heads of the screw elements at the outside of the walls of the electrolytic cell.

In Fig. 6 we have illustrated another arrangement of the electrodes which is also designed to assure electrolytic action upon all of the particles contained in the liquid. In this arrangement the horizontal groups of positive and negative electrodes are so arranged that the negative electrodes of one group overlies or is substantially above the positive electrodes of another group so that the polarity of the electrodes in vertical alignment alternates from positive to negative to positive to negative, etc. By this arrangement negatively charged particles of solid matter carried in any one ascending current will be alternately diverted cross-wise of the flow as the current progresses upwardly through the cell. The turbulence thus electrically produced increases the flocculating chances of the particles. Agitation is produced by the rate of flow of the ascending liquid and there is a definite relationship between the rate of flow, electrode area, amount of agitation, and voltage required.

For a given voltage the mechanical agitation produced by the use of projections or by the alternate arrangement of the electrodes above one another permits wider spacing between electrodes than would be possible if the flow of current alone were relied upon to produce intermingling of the positively and negatively charged particles. Inasmuch as the passage of liquid between the electrodes is comparatively rapid, the mechanical intermingling of the oppositely charged particles is an important factor in rapidly and completely producing an electrostatic bond between the particles.

One particular advantageous characteristic of the treated liquid is due to the fact that the action produced by the electrolytic cell leaves the flocculated and treated particles in such a state that the water is readily drainable. A liquid having this property is known in the filtering art as a free, filterable liquid, as distinguished from a slow liquid from which the water is not so easily separated. In view of this characteristic of the liquid leaving the electrolytic cell in applicants' apparatus, the liquid may be passed directly from the electrolytic cell to a mechanical filter for separating or filtering the water from the solids.

Conduits 73, 74 and 75 are provided for washing out compartments and division of compartments in which sediment may collect. Suitable valves are provided for shutting off their connection with the compartments when the apparatus is functioning for clarification purposes.

What is claimed is:
1. An apparatus for treating electrolytically liquids containing solids, comprising a relatively deep tank of extended cross-sectional area, a substantially vertical conduit in said tank of smaller cross-sectional area than said tank, said conduit having an open top terminating below the top of said tank, an electrolytic cell in said conduit having pairs of horizontally spaced electrodes defining substantially vertical flow paths therebetween, means for supplying a liquid to be treated to the bottom of said conduit for flow upwardly therethrough and discharge into said tank, a shelf extending laterally from adjacent the top of said conduit to form a relatively shallow pond above said conduit in which the velocity of liquid flow is sufficiently reduced to minimize agitation at flotation level, means beneath said shelf for directing a gas upwardly to aid in floating said solids, overflow means for discharging said floating solids continuously adjacent the top of said tank, and discharge means for said liquid below the first-mentioned discharge means.

2. An apparatus for treating liquids containing solids electrolytically, comprising a relatively deep tank of extended cross-sectional area, a substantially vertical conduit in said tank of smaller cross-sectional area than said tank, said conduit having an open top terminating below the top of said tank, an electrolytic cell in said conduit having pairs of horizontally spaced electrodes defining substantially vertical flow paths therebetween for flocculating solids in said liquid, means for supplying said liquid to be treated to the bottom of said conduit for flow upwardly therethrough and discharge into said tank, a shelf extending laterally from adjacent the top of said conduit to form a relatively shallow pond above said conduit in which the velocity of liquid flow is sufficiently reduced to minimize agitation at flotation level whereby some of said solids are floated in a stratum in the upper portion of said tank, means for discharging said floating solids continuously adjacent the top of said tank, partitions extending upwardly from the bottom of said tank, means for discharging liquid from said tank between said partitions, and means introducing gas upwardly between said partitions to oppose the discharge of solids with said liquid.

LLOYD DUNN SMILEY.
EDWARD S. LANSING.

REFERENCES CITED

The following references are of record in the file of this patent:

UNITED STATES PATENTS

| Number | Name | Date |
|---|---|---|
| 671,946 | Holland | Apr. 9, 1901 |
| 791,457 | Dion | June 6, 1905 |
| 799,605 | Lester | Sept. 12, 1905 |
| 1,194,000 | Dobyns et al. | Aug. 8, 1916 |
| 1,516,112 | Moerk | Nov. 18, 1924 |
| 2,242,139 | Munroe | May 13, 1941 |
| 2,299,964 | Crouch | Oct. 24, 1942 |

Certificate of Correction

Patent No. 2,456,897. December 21, 1948.

LLOYD DUNN SMILEY ET AL.

It is hereby certified that errors appear in the above numbered patent requiring correction as follows:

The patent was erroneously issued to the inventors, as assignors, "by direct and mesne assignments, of one-half to Edward S. Lansing and one-half to Howard B. Bishop, of Summit, New Jersey," whereas said patent should have been issued to *Edward S. Lansing Corporation, of New York, N. Y., a corporation of New York, as assignee, by mesne assignments, of the entire interest therein*; in the printed specification, column 7, line 49, for the word "particular" read *particularly*; column 8, list of references cited, line 66, for "Oct. 24, 1942" read *Oct. 27, 1942*;

and that the said Letters Patent should be read with these corrections therein that the same may conform to the record of the case in the Patent Office.

Signed and sealed this 19th day of April, A. D. 1949.

[SEAL]

THOMAS F. MURPHY,
*Assistant Commissioner of Patents.*